(12) United States Patent
Stoiber

(10) Patent No.: US 8,403,660 B2
(45) Date of Patent: Mar. 26, 2013

(54) BLOW MOLD

(75) Inventor: Christian Stoiber, Michelsneukirchen (DE)

(73) Assignee: Krones AG, Neutraubling (DE)

( * ) Notice: Subject to any disclaimer, the term of this patent is extended or adjusted under 35 U.S.C. 154(b) by 0 days.

(21) Appl. No.: 13/213,485

(22) Filed: Aug. 19, 2011

(65) Prior Publication Data

US 2012/0052149 A1    Mar. 1, 2012

(30) Foreign Application Priority Data

Aug. 26, 2010 (DE) .................. 10 2010 039 803

(51) Int. Cl.
*B29C 49/56* (2006.01)
(52) U.S. Cl. ...................................... 425/541
(58) Field of Classification Search .................. 425/195, 425/541
See application file for complete search history.

(56) References Cited

U.S. PATENT DOCUMENTS

| | | | |
|---|---|---|---|
| 7,241,130 B2 | 7/2007 | Arakelyan | |
| 7,267,537 B2 * | 9/2007 | Mitchell et al. | ............... 425/541 |
| 8,231,379 B2 * | 7/2012 | Schmid et al. | ............... 425/541 |
| 2006/0078643 A1 | 4/2006 | Mitchell et al. | |
| 2010/0203185 A1 | 8/2010 | Litzenberg et al. | |

FOREIGN PATENT DOCUMENTS

| | | |
|---|---|---|
| DE | 60308207 T2 | 8/2007 |
| DE | 102007022638 A1 | 11/2008 |
| DE | 102009008632 A1 | 8/2010 |

OTHER PUBLICATIONS

German Search Report DE102010039803.9, dated Jan. 28, 2011.

* cited by examiner

*Primary Examiner* — James Mackey
(74) *Attorney, Agent, or Firm* — Marshall, Gerstein & Borun LLP

(57) ABSTRACT

A blow mold with a stationary mold half and another mold half movable relative to the stationary mold half between closed and open positions, and having a bottom mold comprising a bottom mold axis essentially perpendicular to the moving direction of the other mold half which can be moved relative to the mold halves between an engaged position and a removal position, and which can be at least positively locked with the mold halves in the engaged position and the closed position of the other mold half by at least one collar-like engaging element at the bottom mold, and a ring groove-like counterengagement structure in the mold halves, the engaging element and at least the counterengagement structure form a bayonet catch in the stationary mold half which can be actuated by relative rotary motions of the engaging element about the bottom mold axis and only linear relative movements in the direction of the bottom mold axis.

15 Claims, 2 Drawing Sheets

BLOW MOLD

CROSS-REFERENCE TO RELATED APPLICATION

The present application claims the benefit of priority of German Application No. 102010039803.9, filed Aug. 26, 2010. The entire text of the priority application is incorporated herein by reference in its entirety.

FIELD OF THE DISCLOSURE

The disclosure relates to a blow mold such as the type used in manufacturing containers from preforms.

BACKGROUND

In a blow mold known from FIGS. 5 to 8 of DE 10 2007 022 638 A, the engaging element at the bottom mold is a ring collar continuous in the peripheral direction which projects outwards from the periphery of the bottom mold and, in the engaged position of the bottom mold and the closed position of the mold halves, positively engages with the counterengagement structure embodied as peripheral groove in both mold halves and locks the bottom mold with the mold halves. In the closed position, the mold halves are blocked, for example by locking means for mold half supports, so that the blow mold resists to high internal pressures of for example, often more than 40×105 Pa. The projection of the ring collar at the bottom mold causes the bottom mold, when the blow mold is open, to be dislocated transversely to the bottom mold axis twice, both in the linear movement from the removal position to the engaged position and vice versa, so that the bottom mold can be introduced into or pulled out of the stationary mold half. The motion drive for the bottom mold must perform complex movements which are disadvantageous in case of high numbers of cycles. Furthermore, the manufactured container, whose bottom is seated in the bottom mold, must be guided along in the transverse movement of the bottom mold. Both motion sequences also require that, before the bottom mold is moved to the removal position, the other mold half must at least partially be moved to the open position as a certain dependency between the removal of the container from the bottom mold and the opening angle or opening degree of the mold halves has to be taken into consideration for the control. Very quick and complex movements are performed which, since they are superimposed, must be controlled very precisely and require complex motion drives that need much installation space.

In a blow mold known from DE 10 2009 008 632 A, too, the bottom mold part cannot be retracted and rotated or rotated and pulled out any longer when the mold halves are nearly closed. Here, further transverse movements are rather required as there are no clearances for shifting bayonet elements.

Additional prior art can be found in: DE 603 08 207 T2 and US 2006/0078643 A.

SUMMARY OF THE DISCLOSURE

One aspect of the disclosure is to basically improve a blow mold in view of the bottom mold locking and e.g. also to the effect that, despite a stationary mold half, a simple movement of the bottom mold between the engaging position and the removal position is possible.

The bayonet catch according to the disclosure formed between at least one mold half and the bottom mold can be actuated basically, and in particular in case of a stationary mold half, in a very simple motion sequence. To lock and release the bayonet catch, it only requires in either case one relative rotary motion of the engaging element about the bottom mold axis at least relative to the stationary mold half, and when the bayonet catch is released, it only requires a linear motion of the bottom mold in the direction of the bottom mold axis. In this manner, a simple, so to speak punctiform or linear removal motion is possible. Vice-versa, the bottom mold can also be linearly brought into the engaging position without any transverse motions relative to the bottom mold axis before the bayonet catch is locked by a relative rotary motion about the bottom mold axis. The relative releasing rotation of the engaging element can be performed simultaneously with the unlocking of the mold support which previously pressed the mold halves against each other. The linear removal movement of the bottom mold can also begin immediately, or already be performed in the starting phase of the opening movement of the mold halves. Thereby, per cycle, more time is proportionally available for the removal movement of the bottom mold, meaning that the movement for the removal of the bottom mold takes place more slowly and can be easily controlled, which is an advantage in short cycle times. One can also save time for locking the bottom mold since, being performed quickly enough, the simple movements take less time than complex motion sequences with superimposed linear and transverse movements relative to the bottom mold axis. The engaging element can be already rotated in the removal step when the mold halves are unlocked, without the other mold half having already noticeably moved away from the stationary mold half. After the relative releasing rotary motion of the engaging element, the bottom mold is immediately free to be moved to the removal position by the simple linear motion in the direction of the bottom mold axis.

The bayonet catch between the bottom mold and at least the stationary mold half permits removal with only one relative rotary motion of the engaging element and one linear motion of the bottom mold when the other mold half is anyway moved to the open position before the manufactured container is removed from the mold, so that the engaging element comes clear from the other mold half by the movement of the other mold half. However, to be able to begin and perform the removal operation of the bottom mold as soon as possible, e.g. as soon as the mold halves are relieved from the locking pressure, it is suitable to also provide a bayonet catch between the engaging element and also the other mold half which can be actuated in a way similar to that of the bayonet catch between the bottom mold and the stationary mold half. The removal operation of the bottom mold can then be performed as soon as the mold halves are relieved from the locking pressure or the other mold half starts to move away without already having reached the complete open position.

In a suitable embodiment, the engaging element is permanently arranged at the bottom mold, and the engaging element is rotated about the bottom mold axis together with the bottom mold. This permits a simple bottom mold and a simple motion drive for it.

In a particularly suitable embodiment, however, the engaging element is arranged at the bottom mold to be rotated about the bottom mold axis relative to the latter, so that the removal operation (as well as the locking operation) can be performed without any relative rotary motion of the bottom mold itself. For the actuation of the bayonet catch, a relatively moderate torque is thus sufficient.

In a suitable embodiment, the engaging element of the bottom mold comprises interruptions between individual collar segments in the peripheral direction. The collar segments project outwards over the periphery of the bottom mold and create the positive locking with the counterengagement structure at least of the stationary mold half. At least in the stationary mold half, though preferably also in the other mold half, at least one clearance adapted to the size and the projection of at least one collar segment is formed which linearly extends, starting from the counterengagement structure, in the moving direction of the bottom mold into or out of the mold position to one end of the mold half. If the bayonet catch is unlocked, i.e. if the respective collar segment is aligned with the clearance, the bottom mold can be immediately linearly moved with the collar segment through the clearance in the direction of the bottom mold axis. This concept is of basic importance since the bottom mold cannot only be moved linearly into and out of a stationary mold half utilizing the clearances, but is also advantageous in case of two relatively movable mold halves because the linear motion of the bottom mold can be performed completely independent of the motions of the mold halves or the mold support halves. Independent kinematic sequences of the movements of the bottom mold and the movements of the mold halves can be multiply realized already due to the bayonet catch with the clearances having axial or linear extensions. So the mold halves could be already closed by means of the mold support halves, and the bottom mold could be only then linearly introduced, and vice-versa. This results e.g. in less wear at a bottom mold lifting cam of the drive mechanism since less power has to be transmitted because more time for the movement of the bottom mold is available if the movements or the motion cycles of the mold halves do not define any time allowed for the movement of the bottom mold. For the molding operation, the bottom mold actually only has to be in place in the blow mold when the blown container is about to contact the bottom mold. However, this point in time is reached long after the blow mold has been closed. The concept of the bayonet catch with the clearances is thus advantageous independent of whether a stationary or a non-stationary mold half is provided due to the separation of functions that thereby becomes possible.

To achieve clear positive locking, optionally supported by non-positive locking by the locking pressure of the mold halves, it is suitable for the collar segment to be embodied as prism ring bridge. The counterengagement structure in the respective mold half is then a simple peripheral groove with a prismatic cross-section constant in the circumferential direction. The groove edge of the peripheral groove facing one end of the mold half is interrupted by the respective clearance to let the collar segment pass.

A suitable embodiment in which the engaging element can be rotated relative to the bottom mold about the bottom mold axis comprises the collar segments, preferably as part of a ring disk, which are rotatably guided in a peripheral groove of the bottom mold. The respective collar segment is coupled to an actuating shaft which is rotatably mounted in the interior of the bottom mold. The actuating shaft can comprise an accessible rotary actuation end underneath the bottom mold, preferably a crank arm with a dog on which the motion mechanism can act at least for rotating the engaging element. This permits a structurally simple embodiment of the bottom mold with the engaging element. The motion mechanism can also control the linear motions. As an alternative, a separate motion mechanism can be used for this.

Suitably, at least one rotation limit stop for the rotary motion of the collar segments relative to the bottom mold about the bottom mold axis is furthermore provided in the bottom mold, preferably in or within the peripheral groove between a lower part of the bottom mold and an upper part screwed to it. This rotation limit stop can be, for example, the connection, e.g. a screwed joint, between the lower part and the upper part of the bottom mold, which here fulfills an additional function because it determines exactly predetermined relative rotary positions of the collar segments which are important on the one hand for the efficient, precisely reproducible locking of the bottom mold with the mold halves, and on the other hand for the exact rotary positioning of the collar segments for the removal operation. The job of the rotary positioning could, as an alternative, however, also be taken on by the motion mechanism of the bottom mold or the collar segments, respectively, or by a stop in the counterengagement structure.

In a suitable embodiment, two clearances are provided for two collar segments per mold half. Just as the interruptions between the collar segments, the collar segments and the clearances also have approximately identical peripheral extensions to ensure relatively uniform supporting relations across the periphery in the locked state. Here, the clearances in each mold half can be spaced apart from a mold parting plane of the mold halves by approximately the same distances. This offers the advantage that in the locked state, at least one collar segment bridges the mold parting half in a supporting manner. A reverse design is also possible, i.e. then at least one clearance bridges the mold parting half.

To prevent the collar segment from getting caught during the movement of the bottom mold to the engaged position due to vibrations or misalignments, it can be suitable to provide an introduction inclination in each clearance at the one end of the mold half so that the collar segment is neatly introduced despite a misalignment.

BRIEF DESCRIPTION OF THE DRAWINGS

With reference to the drawings, embodiments of the subject matter of the disclosure are illustrated. In the drawings.

DETAILED DESCRIPTION OF THE PREFERRED EMBODIMENT

Figure 1:
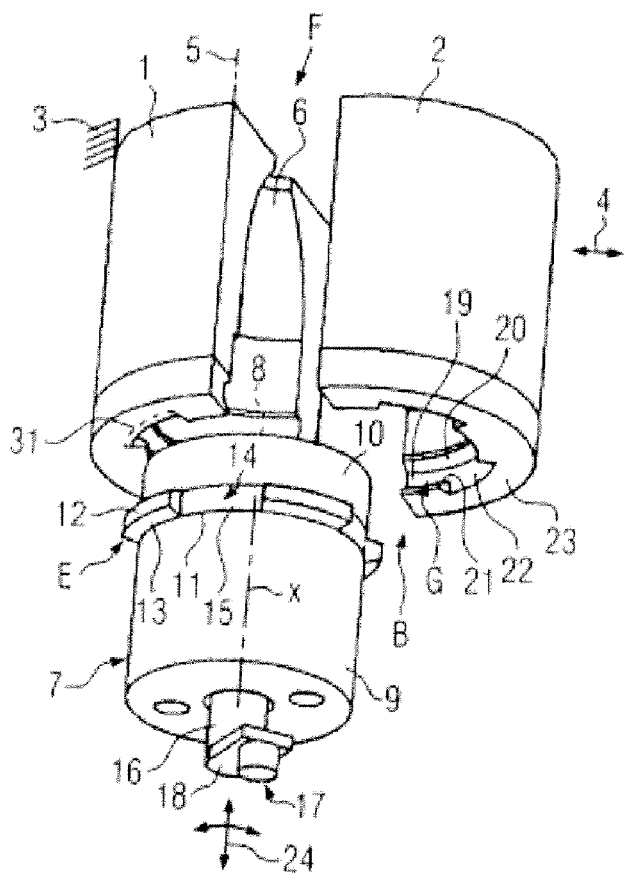
FIG. 1 shows a schematic perspective representation of a blow o d where mold halves are located in an open position and a bottom mold in a removal position.

A blow mold F in FIG. 1, for example for manufacturing containers from preforms in a blow molding operation or in a stretch-blow molding operation, is installed in a non-depicted blow molding station of a blow molding machine. Here, the blow mold F is shown without usually provided mold support means and comprises as main components a stationary mold half 1 (also referred to as shell mold), and another mold half 2 movable relative to the stationary mold half 1. The movable mold half 2 can be folded open about a non-depicted axis or moved linear (as indicated) by means of a motion drive 4 not distinguished more in detail. The mold halves 1, 2 can be closed in a closed position of the other mold half 2 in a mold parting plane 5 and can be locked to each other under a locking pressure, for example by the non-depicted mold support means. The stationary mold half 1 is fixed, for example, in a support 3.

A bottom mold 7 is a further component and serves with its upper side 8 to define a mold cavity 6 of the blow mold F into which a preform is introduced and then molded. At the bottom mold 7, at least one ring collar-like engaging element E projecting outwards is here provided essentially in a plane parallel to the moving direction of the other mold half 2, the element E being used to lock the bottom mold 7 with the mold halves 1, 2. The bottom mold 7 can be integrally formed with the engaging element E and be both rotatably and linearly movable in the direction of a bottom mold axis X.

In the shown embodiment, however, the bottom mold 7 consists of a lower part 9 and an upper part 10 connected to it (for example connected via a screwed joint (FIGS. 2 and 3)). The engaging element E is in FIG. 1, for example, a ring disk 14 which is rotatably guided in a peripheral groove 11 of the bottom mold 7 (between the lower part 9 and the upper part 10) about the bottom mold axis X. The bottom mold axis X can correspond to the central axis of the mold cavity 6. The engaging element E consists of projecting collar segments 12 and interruptions 15 alternating in the peripheral direction which can, though do not have to, have identical peripheral dimensions and are arranged, for example, at regular distances. Each collar segment 12 suitably is a prism ring bridge with a prismatic cross-section and beveled edges 13. Each interruption 15 can recede with respect to the outer periphery of the bottom mold 7. The ring disk 14 comprising the collar segments 12 and the interruptions 15 is coupled to an actuating shaft 16 which is, for example, arranged inside in the bottom mold 7 to be rotatable about the bottom mold axis X and projects with its lower end from the bottom mold 7 and comprises an operating end 17 there, for example a crank arm 18 with a dog to be acted upon by a motion drive 24 for the bottom mold 7. Acting on the operating handle 17, the motion drive 24 can here apply both essentially mere axial linear motions in the direction of the bottom mold axis X and relative rotary motions about the bottom mold axis X. As an alternative, the motion drive 24 could also be designed such that the linear motion of the bottom mold 7 in the direction of the bottom mold axis X and the relative rotary motion of the actuating shaft 16 about the bottom mold axis X are applied separately.

A counterengagement structure G for the engaging element E of the bottom mold 7 is provided inside of the mold halves 1, 2. This counterengagement structure G is, for example, a circumferential peripheral groove 19 with a constant cross-section, its cross-section being adapted to the cross-section of each collar segment 12. Thus, the peripheral groove 19 has, for example, a prismatic cross-section with beveled edges 20 and 21. Starting from one interruption in the edge 21 each, at least one clearance 22 each extends from the counterengagement structure G at least of the stationary mold half 1, suitably also of the other mold half 2, to the end 23 of each mold half 1, 2 facing the bottom mold 7. The size and dimension of the clearance 22 corresponds to the size and peripheral dimension of a collar segment 12, or it is slightly larger than a collar segment 12. The course of the clearance 22 is linear and in parallel to the bottom mold axis X.

The other mold half 2 shown in its open position in FIG. 1 can be adjusted (see FIG. 2) to a closed position with the stationary mold half 1 by the motion drive 4 and then be acted upon by a locking pressure or locked with the mold half 1 under the locking pressure. The bottom mold 7 can be transferred from the removal position shown in FIG. 1, here even underneath the end 23 of the mold halves 1, 2, to an engaged position indicated in Fig. 2 in the direction of the bottom mold axis X and can be locked with the counterengagement structure G via the engaging element E, suitably before the mold halves 1, 2 are locked in the closed position under the locking pressure.

Figure 2:
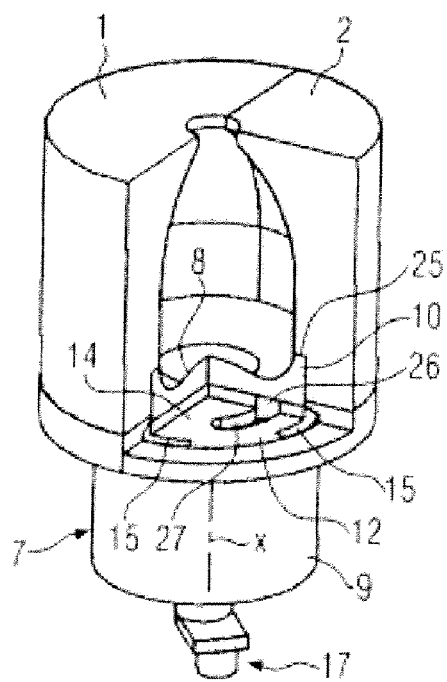
FIG. 2 shows a perspective view of the blow mold, partially cut open, where the mold halves are in the closed position and the bottom mold is about to take its engaged position.

In FIG. 2, the bottom mold 7 has already reached its engaged position, i.e. each collar segment 12 has entered the annular groove 19 through the clearance 22, the interruptions 15 still being opposite the groove edge 21. 26 in FIG. 2 indicates, for example, a rotation limit stop which can be defined by a connection screw between the lower part 9 and the upper part 10, and which cooperates with a slot 27 in the ring disk 14. In the position shown in FIG. 2, the slot 27 abuts against the end of the rotation limit stop 26, which is in Fig. the 2 right end, so that each collar segment 12 is still aligned with a clearance 22. The mold halves 1, 2 have already reached their closed position, but are suitably not yet locked under the locking pressure.

Figure 3:
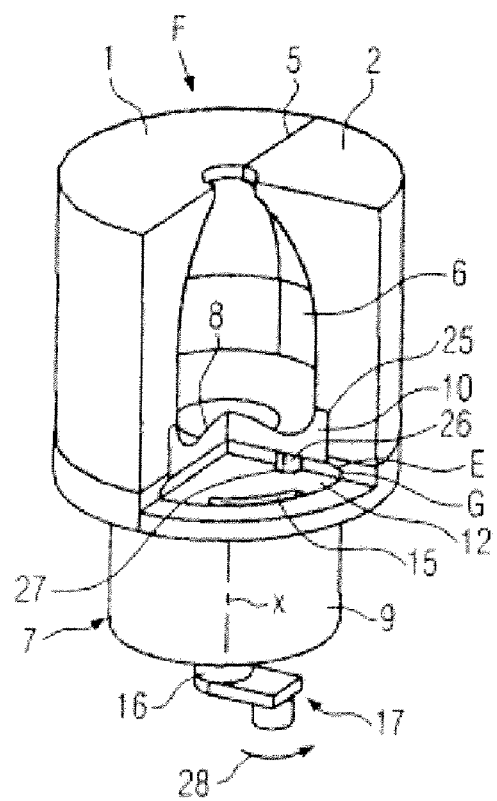
FIG. 3 shows a perspective representation of the blow mold, partially cut open for clarity reasons, where the mold halves are in the closed position and the bottom mold is in the locked position.

FIG. 3 shows the next phase in which the actuating shaft 16 has been rotated, for example, in the direction of an arrow 28 to such an extent that the rotation limit stop 26 abuts at the other end of the slot 27 and one interruption each is aligned with a clearance not shown in FIG. 3, while each collar segment 12 rests on the groove edge 21. Subsequently, the mold halves 1, 2 are locked under the locking pressure, so that the bottom mold 7 with the mold halves 1, 2 is also locked at least positively, suitably supported by non-positive locking, and the blow mold F is now ready for a manufacturing process of a container for which a preform has been introduced into the mold cavity 6, suitably in the phases between FIGS. 1 and 2.

Figure 4:
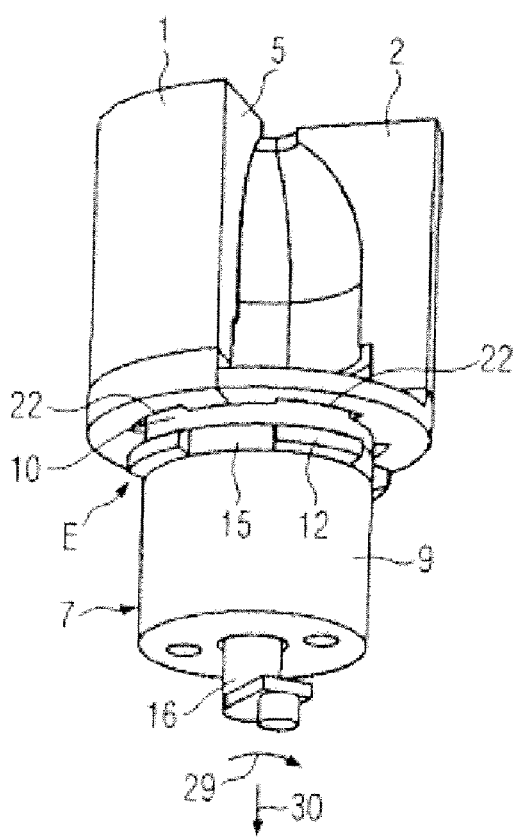
FIG. 4 shows a perspective representation of the blow mold, partially cut open, where the mold halves are still in the closed position, optionally without locking pressure, or one mold half is about to move away from the other mold half, and the bottom mold is about to move to the removal position.

A removal phase follows (FIG. 4) after the container has been manufactured, for which first the locking of the mold halves 1, 2 under the locking pressure is removed and/or the other mold half 2 is optionally already about to move away from the stationary mold half 1. By this, the positive locking of the collar segments 12 with the peripheral groove 19 is first maintained, however the non-positive locking is released, so that the engaging element E can be rotated via the actuating shaft 16 in FIG. 4 for example in the direction of the arrow 19 until each collar segment 12 is again aligned with a clearance 22. Then, the bottom mold 7 is moved in the direction of the arrow 30 downwards and pulled away from the bottom of the molded container, or optionally even together with the latter, downwards until the collar segments 12 have exited from the clearances 22. In the further sequence, the other mold half 2 is moved away from the stationary mold half 1, and the produced container is removed.

For the introduction of the bottom mold 7 and its locking and the removal, thus only linear motions in the direction of the bottom mold axis X and relative rotary motions of the engaging elements E about the bottom mold axis X are required, permitting a relatively simple motion drive and above all offering the advantage that the removal operation can already be performed while the other mold half 2 has not yet been moved away completely. When the produced container is removed from the bottom mold 7, it does not have to be displaced in the transverse direction. This provides more time for the movements of the bottom mold in the cycle of removing the container and charging the blow mold again, so that these movements can be performed slowly, or the time between the production cycles is even shortened as the simple motion of the bottom mold can be performed very quickly.

In the shown embodiment, the bottom mold 7 has, for example, four collar segments 12 distributed at regular intervals, and in the mold halves 1, 2, two correspondingly large clearances 22 are provided. The clearances 22 are here located at a distance from the mold parting plane 5, so that in the locked state, a supporting collar segment 12 bridges the mold parting plane 5. As an alternative, one clearance 22 each could bridge the mold parting plane 5. The numbers of collar segments 12 and clearances 22 could be other than four and/or be uneven. In FIG. 1, an introduction inclination 31 is furthermore indicated at at least one clearance 22 in a dashed line which promotes an easier introduction of the collar segment 12. As another alternative, at least one rotation limit stop could be provided in the peripheral groove 19, which, for example, determines the correct locking position of the collar segments 12. This rotational positioning of the collar segments 12 could, in a further alternative, also be taken on by the motion drive 24 in the rotary motions (arrows 28, 29).

The mold halves 1, 2 are embodied adjacent to the counter engagement structure G with recesses 25 into which the upper part 10 of the bottom mold 7 can be introduced. Optionally, the peripheral groove 19 and each collar segment 12 are configured such that they have a slight draft, so that in the rotary motion in the direction of the arrow 28, each collar segment 12 is somewhat lifted and additionally presses the upper part 10 into the recess 25.

The bayonet catch concept with the axial clearances 22 for the collar segments 12 permits, independent of whether a stationary mold half or only movable mold halves are provided, to separate the kinematic motion sequences of the closure of the mold and the linear movement of the bottom mold or make them independent of each other. For the bottom mold can still be introduced, or be relatively slowly introduced, when the mold halves are already nearly or completely closed. Thus, for the movement of the bottom mold, a longer time range, which is above all not restricted by the duration of the movement of the mold halves, is available, resulting in important advantages (e.g. reduction of wear).

The invention claimed is:

1. Blow mold for manufacturing containers from preforms, comprising a stationary mold half, at least one other mold half movable relative to the stationary mold half between closed and open positions, a bottom mold comprising a bottom mold axis (X) essentially perpendicular to the moving direction of the other mold half moveable relative to the mold halves between an engaged position and a removal position, and which can be at least positively locked with the mold halves against movements in the moving direction of the bottom mold in the engaged position and the closed position of the other mold half by at least one engaging collar element projecting outwards from the outer periphery of the bottom mold and being at least approximately parallel to the moving direction of the other mold half, and a counter engagement ring groove structure in the mold halves, wherein the engaging collar element at the bottom mold and at least the counter engagement ring groove structure form a bayonet catch in the stationary mold half which can be actuated in the movement of the bottom mold between the engaged position and the removal position by relative rotary motions of the engaging collar element about the bottom mold axis (X) and only essentially linear relative movements in the direction of the bottom mold axis (X) with respect at least to the stationary mold half.

2. The blow mold according to claim 1, wherein the engaging collar element and the counter engagement ring groove structure form a bayonet catch also in the other mold half which can be actuated synchronously with the bayonet catch in the stationary mold half when the other mold half is in or substantially in its closed position.

3. The blow mold according to claim 1, wherein the engaging collar element can be rotated at the bottom mold relative to the bottom mold about the bottom mold axis (X).

4. The blow mold according to claim 1, wherein the engaging collar element of the bottom mold comprises interruptions between collar segments in the circumferential direction and that at least in the stationary mold half clearances adapted to the size and the projection of the collar segments are provided which extend, starting from the counter engagement ring groove structure, substantially linear in the moving direction of the bottom mold into or out of the removal position to an end at least of the stationary mold half to pass through the collar segments, wherein each collar segment is configured as a prism ring bridge, and the counter engagement ring groove structure is a prismatic peripheral groove having a groove edge facing the one end of the respective mold half, the groove edge being interrupted by the respective clearance.

5. The blow mold according to claim 4, wherein the collar segments are guided in a peripheral groove of the bottom mold to be rotatable about the bottom mold axis (X), and are coupled to an actuating shaft which is rotatably mounted inside the bottom mold and comprises a rotary actuation end accessible underneath the bottom mold.

6. The blow mold according to claim 5, and wherein at least one rotation limit stop for the rotary motion of the collar segments is provided relative to the bottom mold.

7. The blow mold according to claim 4, wherein at least two clearances are provided per mold half for the passage of two respective collar segments of the bottom mold.

8. The blow mold according to claim 4, wherein each clearance has an introduction inclination at one end of the respective mold half.

9. The blow mold according to claim 1, wherein synchronized motion drives are provided for the other mold half and the bottom mold.

10. The blow mold according to claim 4, and wherein clearances adapted to the size and the projection of the collar segments are provided in the other mold half.

11. The blow mold according to claim 5, wherein the peripheral groove is between a lower part of the bottom mold and an upper part of the bottom mold screwed thereto.

12. The blow mold according to c aim 5, wherein the collar segments are embodied as part of a ring disk.

13. The blow mold according to claim 5, wherein the rotary actuation end comprises a crank arm with a dog.

14. The blow mold according to claim 6, wherein the at least one rotation limit stop is provided one of in or within the bottom mold, or between a lower part of the bottom mold and an upper part of the bottom mold screwed thereto.

15. The blow mold according to claim 7, wherein the clearances in each mold half have approximately the same distances from a mold parting plane of the mold halves.

* * * * *